Aug. 12, 1924.
H. WIEDERHOLD
COOKING UTENSIL
Filed Aug. 10, 1923
1,504,921
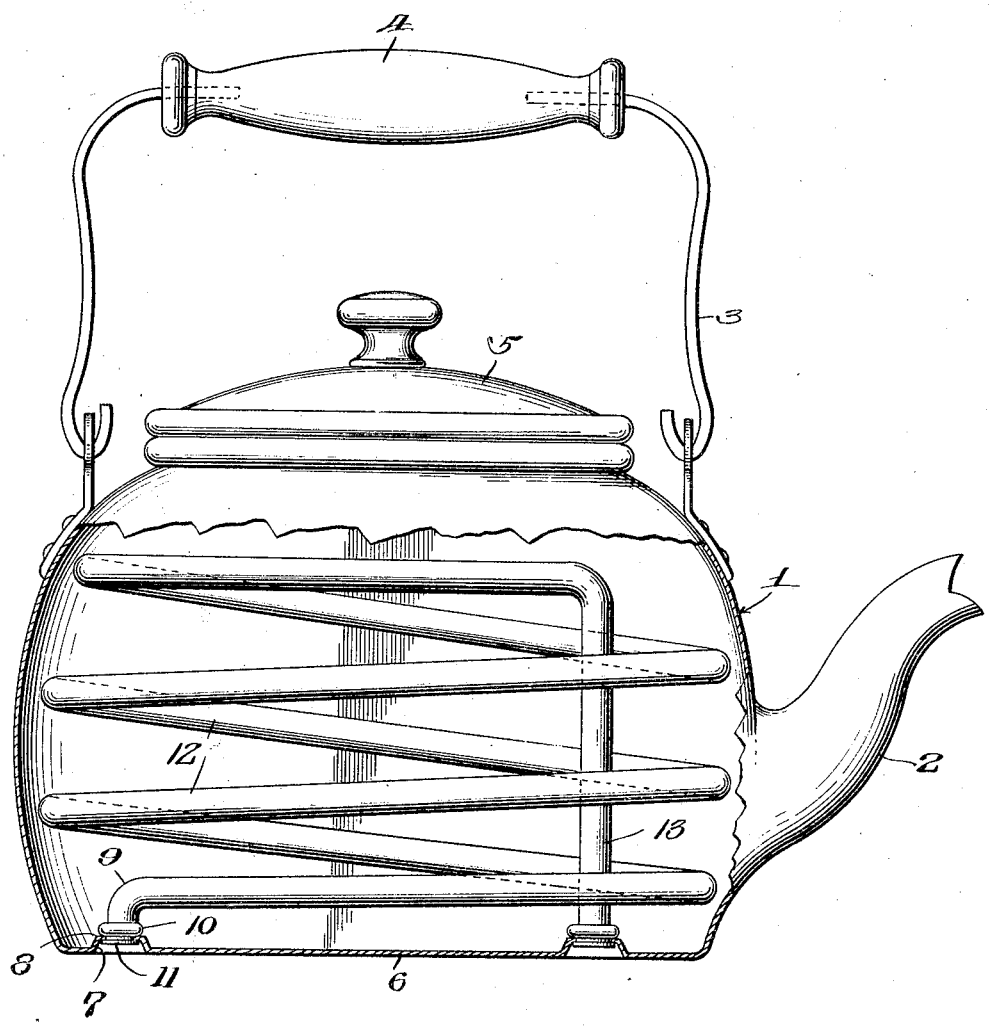

Patented Aug. 12, 1924.

1,504,921

UNITED STATES PATENT OFFICE.

HENRY WIEDERHOLD, OF NEW YORK, N. Y.

COOKING UTENSIL.

Application filed August 10, 1923. Serial No. 656,725.

*To all whom it may concern:*

Be it known that I, HENRY WIEDERHOLD, a citizen of the United States, residing at Ozone Park, borough and county of Queens, city and State of New York, have invented a new and useful Improvement in a Cooking Utensil, of which the following is a specification.

My invention relates to utensils used for the cooking of food, the heating of liquids, etc., and is particularly adapted to be applied to vessels used for boiling water. My invention is also particularly adapted to be applied to vessels which are used over the ring type of gas or oil burner, or over other types in which the heat therefrom is distributed over a considerable area as distinguished from those in which it is substantially localized. The primary object of my invention is to make it possible to heat liquids, etc., to a given temperature in considerably less time than is required with the common type of vessel, thereby economizing in both time and fuel consumption. Another object is to provide a vessel which may be easily and economically constructed. Other advantages of my invention will be apparent to those skilled in the art.

The accompanying drawing illustrates the preferred form of my invention, as applied to a tea kettle.

In the drawing, 1 represents the body portion of a tea kettle of the usual form, having a spout, 2, bail, 3, heat-insulated handle, 4, and cover, 5. Near the outer circumference of the base, 6, of the kettle, and distant from the vertical axis thereof approximately the length of the radius of the average commercial burner of the type mentioned, the base is cupped upwardly, as shown at 7. At the upper bend of the cup, at the point designated 8, there is a narrow annular flange, the remaining portion within such flange being cut away. The firetube or flue, 9, is beaded, as shown at 10, near its open end, and the extreme end thereof is riveted, over the flange, 8, as shown at 11.

The tube, 9, is substantially helical in form, as shown, and the convolutions, 12, thereof are located near the outer wall of the utensil. The purpose of this design and arrangement is to leave the greatest possible clear and unobstructed space within the utensil and, at the same time, provide the greatest possible heating surface in contact with the contents of the vessel. It will thus be seen that a vessel constructed according to my invention is useful not only for the heating of liquids but is equally available, for instance, for boiling vegetables since there is plenty of unobstructed space therewithin.

As shown in the drawing, one end of the tube, 9, upon leaving the connection with the base, 6, of the kettle, immediately assumes its helical form. At the top of the helix, the tube may return to the base, 6, as shown at 13; when my invention is in this form, the tube is attached to the base at both points of contact in the manner already described; further, each of such points of contact is located at substantially the same distance from the vertical center of the vessel.

Although the first described form of my invention may appear at first glance to be comparatively inefficient, I have nevertheless found that, by its use, it is possible to bring water to the boiling point in approximately one-fourth of the time required for a kettle which has no means for supplying heat directly to its interior. Furthermore, such form has certain advantages over the modified form shown and described in that the fumes of combustion are not liberated within the vessel and, in fact, are not liberated at any point where the burner itself does not liberate them; thus the hand of the person using a vessel employing my invention is not so apt to be burned as when the direct heat of combustion is discharged at a point where such discharge does not usually occur. This arrangement also prevents the deposition of soot within the vessel and prevents solution of unburned or partially burned gases by the contents of the vessel which may occur where the tube discharges within the vessel; such solution of gases is particularly objectionable because of the common presence of carbon monoxide where the burner is not properly adjusted for complete combustion.

I am aware that the apparatus shown is capable of modification by those skilled in the art without departure from my invention and I therefore desire protection for all such modifications as come within the scope of the appended claims.

Having described my invention, what I claim is:

1. A cooking utensil comprising a chamber for the material to be heated and a substantially helical heating tube therewithin having both of its ends opening through the base of the utensil at points near the periphery thereof.

2. A cooking utensil comprising a chamber for the material to be heated and a substantially helical heating tube therewithin having both of its ends opening through the base of the utensil at points near the periphery thereof, the coils of said heating tube being located in proximity to the outer wall of the utensil.

3. A cooking utensil comprising a chamber for the material to be heated, and a substantially helical heating tube therewithin having both of its ends opening through the base of the utensil at points near the periphery thereof and substantially on a circle having its center on the vertical axis of the utensil.

4. A cooking utensil comprising a chamber for the material to be heated and a substantially helical heating tube therewithin having both of its ends opening through the base of the utensil at points near the periphery thereof and substantially on a circle having its center on the vertical axis of the utensil, the coils of said heating tube being located in proximity to the outer wall of the utensil.

5. A cooking utensil having a helically coiled tube therein, said tube opening at both ends through the base of the utensil, such openings being located approximately on a circle concentric with the vertical axis of the utensil and having a radius substantially equal to the radius of the average type of burner with which such utensil is to be used.

HENRY WIEDERHOLD.